Figure 1:
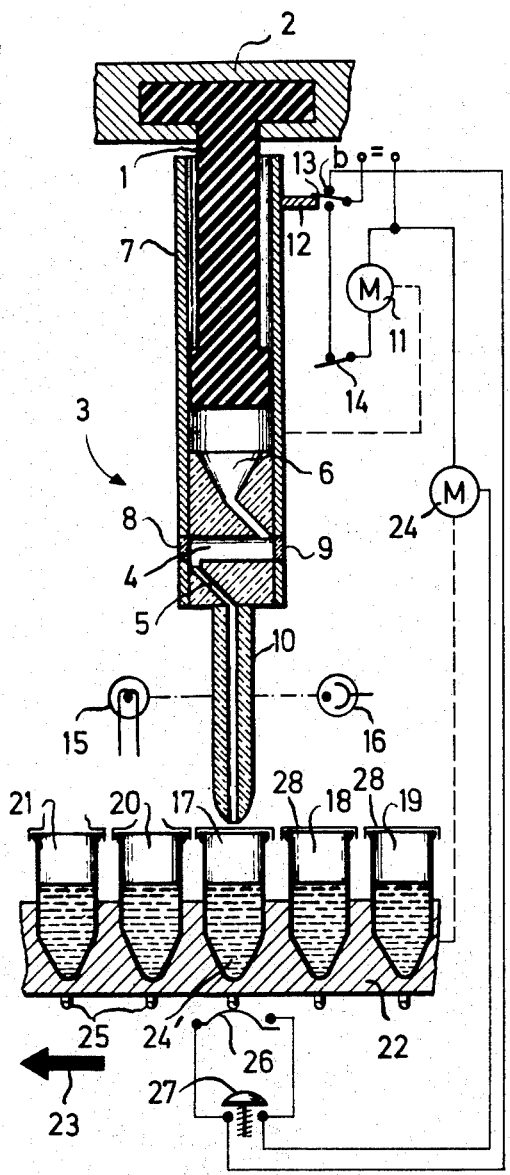

United States Patent
Höcherl

[15] 3,699,348
[45] Oct. 17, 1972

[54] RADIATION SENSITIVE DEVICE FOR THE SUCCESSIVE INVESTIGATION OF SEVERAL SAMPLES

[72] Inventor: Günther Höcherl, Aalen, Germany
[73] Assignee: Carl Zeiss-Stiftung, Wuerttemberg, Germany
[22] Filed: Aug. 6, 1971
[21] Appl. No.: 169,758

[30] Foreign Application Priority Data

Aug. 14, 1970 Germany..........P 20 40 481.3

[52] U.S. Cl..................250/218, 356/180, 23/253 R, 73/425.6
[51] Int. Cl............................................G01n 21/26
[58] Field of Search.............250/218; 350/180, 246; 23/253 R, 259; 73/425.4, 425.6

[56] References Cited

UNITED STATES PATENTS

| | | | |
|---|---|---|---|
| 3,246,559 | 4/1966 | Clifford, Jr. | 356/246 |
| 3,266,322 | 8/1966 | Negersmith et al. | 23/253 R |
| 3,418,080 | 12/1968 | Rochte et al. | 23/259 |
| 3,607,094 | 9/1971 | Beer | 23/253 R |

Primary Examiner—Walter Stolwein

[57] ABSTRACT

An arrangement for the successive investigation of several samples by light passing through the sample comprises a vertically disposed flow cell the upper end of which is fixedly connected to a vertical tube surrounding a fixedly mounted piston. The lower end of the flow cell has a suction nipple attached thereto which upon downward movement of the flow cell relative to the fixed piston is immersed in one of the sample vessels which are arranged on a horizontally movable conveyor so that the liquid sample therein is drawn into the flow cell which is provided in its circular wall with two diametrically opposed windows through which the measuring light is adapted to pass for impinging a photo cell. An electric motor moves the vertical tube and therewith the flow cell and suction nipple thereon upwardly and downwardly and during the upward movement discharges the sample liquid in the flow cell into the vessel from which it was taken, whereupon the sample vessels are moved horizontally one step further until the next sample vessel comes into a position directly below the suction nipple on the flow cell.

6 Claims, 2 Drawing Figures

PATENTED OCT 17 1972  3,699,348

INVENTOR
Günther Höcherl
BY
Singer, Stern & Carlberg
ATTORNEYS

RADIATION SENSITIVE DEVICE FOR THE SUCCESSIVE INVESTIGATION OF SEVERAL SAMPLES

The invention relates to an arrangement for the successive investigation of several samples by means of light passing through the sample.

An arrangement for the photometric analysis is known, in which a flow cell is fixedly arranged in the measuring path of rays. With the filling opening of this cell a hose is connected which is successively immersed into different sample vessels. The discharge opening of the cell is connected with a hose pump which operates intermittently and feeds a respective volume which is at least sufficient for the complete filling of the cell.

This prior art arrangement is relatively expensive and requires relatively long hose conduits.

It is an object of this invention to provide an arrangement for the successive investigation of several samples by means of light passing through the sample, which is distinguished by a particularly simple assembly, keeps the error of carry-over very small and operates without hose conduits.

In the arrangement of the invention the suction end of a flow cell is fixedly connected with a suction nipple and the discharge end is fixedly connected with a tube surrounding a stationary piston and arranged for upand down-movement relative to the same in such a manner, that after a downward movement the flow cell permits the passage of the measuring light, and sample vessels are arranged for movement relative to the suction nipple in such a manner that the nipple is immersed in a respective vessel after downward movement has been effected. The tube and the suction nipple preferably constitute one structural unit.

The up- and down-movement of the tube is effective in a simple manner and without necessitating hose conduits to fill and empty the flow cell. The size of the stroke of the tube is so selected that sufficient sample liquid is used for a previous rinsing of the cell, so that the error of carry-over can be kept very small.

Preferably, an electric motor is employed for the movement of the tube and an abutment is connected with the tube itself, which after the final positions are reached cooperates with respective limit switches and thereby disconnects the motor. The same motor may, however, also be used via a separate gearing to further advance the sample vessels by one position after effected upward movement of the tube. Obviously, also a second motor can be used for this movement.

Figure 2:
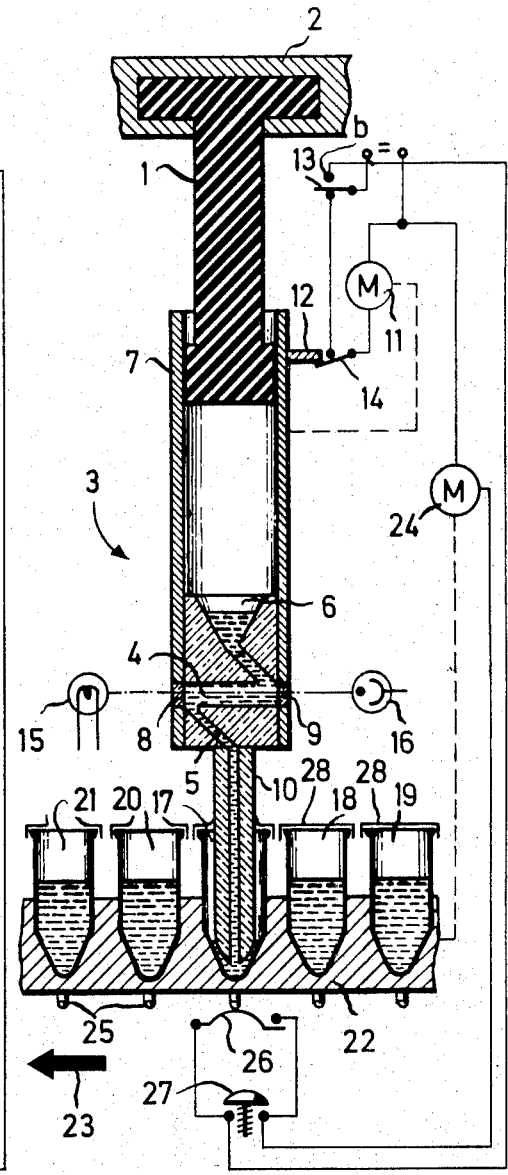

The invention will now be described more fully with reference to the FIGS. 1 and 2 of the accompanying drawings, in which:

FIG. 1 illustrates an embodiment of arrangement of the invention after the flow cell has been emptied, and FIG. 2 illustrates the embodiment of FIG. 1 with the cell in its measuring position.

In FIG. 1 reference numeral 1 designates a vertically disposed piston whose upper end is fixedly connected with a housing 2. This piston is made of a material which is commercially available under the trademark Teflon.

Reference numeral 3 designates a flow cell comprising the actual cell space 4, a suction conduit 5, and a discharge conduit 6.

The cell 3 is fixedly connected with a tube 7 which sealingly surrounds the piston 1. To close off the cell space 4, the two windows 8 and 9 of glass or quartz are used. A suction nipple 10 is fixedly connected with the suction conduit 5 of the cell 3. The nipple 10, the cell 3 and the tube 7 constitute a structural unit.

An electric motor 11 is provided for the up- and down-movement of the tube 7. In this embodiment of the invention the motor moves the tube 7 via a not illustrated gearing. A pin 12 is attached to the outer wall of the tube, which cooperates with limit switches 13 and 14 in such a manner that the motor 11 is disconnected automatically when a final position of the tube 7 has been reached.

Reference numeral 15 designates a light source whose light, in measuring position, impinges upon a photocell 16 after transversely passing through the cell space 4 and the windows 8 and 9. The reproductibility of the measuring result is better than 1 percent in the illustrated arrangement without the use of stops or diaphragms.

Below the suction nipple 10 are arranged sample vessels 17, 18, 19, 20 and 21 mounted in a horizontal support 22. The support 22 is movable in a horizontal direction as indicated by the arrow 23. By way of example, the support comprises a plastics belt into which the sample vessels of plastics or of glass are inserted. The movement of the support 22 is effected by the motor 24 which moves the support via a not illustrated gear. Pins 25 are attached to the support 22 which cooperate with a switch 26 in such a way that this switch is opened as soon as one of the sample vessels 17, 18, 19, 20, 21 is just below the suction nipple 10 thus causing the motor 24 to stop.

The operation of the arrangement hereinbefore described is as follows:

Starting with the position illustrated in FIG. 1, in which the cell 3 is empty, the tube 7 is moved downwardly by the motor 11. First, air is drawn into the cell 3, namely until the suction nipple 10 is immersed in the sample liquid 24. After down-movement of the tube 7 has been effected, the motor 11 is switched off by the limit switch 14. The cell 3 is now filled with the sample liquid as shown in FIG. 2. In this lower end position of the tube 7, the cell space 4 is exactly in a measuring position, i.e., the light originating from the light source 15 passes through the sample substance in the cell space 4 and impinges upon the photocell 16.

As is shown in FIG. 2, the design of the suction nipple 10 is such that at a uniform feed performance a liquid displacement is effected in the sample vessels which corresponds to the conical design of the lower end of the sample vessels. In view thereof during sample feeding no air can be drawn in on the one hand, while on the other hand the whole sample vessel 17 is emptied.

After a measurement has been effected, the upward movement of the tube is initiated, which is stopped by the switch 13 when the upper end position is reached. In this position the switch 13 is on contact $b$. During the upward movement, the entire sample liquid 24' is discharged into the sample vessel 17. Thus, when the upper end position of the tube is reached, also the flow cell 3 is completely empty.

In this raised position of the tube 7, the operator presses the switch 27 which shunts the opened switch 26. As switch 13 is on contact *b* the motor 24 is thereby energized and moves the conveyor belt 22 in the direction of the arrow 23. As soon as the belt 22 is moved switch 26 is closed so that the switch 27 can be opened without interrupting the belt movement. When the conveyor belt 22 is advanced by one position another pin 25 contacts switch 26 and opens it thus causing motor 24 to stop. In this new position the next sample cell 18 is under the suction nipple 10 so that this nipple during the next downward movement of tube 7 is immersed in this cell.

If, for example, the cell space 4 at a length of 10 mm has a diameter of 2 mm and 200 $\mu$l sample substance is available, then 30 $\mu$l are required for the filling of the cell space 4, and approximately 5 $\mu$l remain in the suction nipple 10, and the rest is available for previous rinsing of the flow cell 3. In this particular arrangement, the error of carry-over for aqueous solutions is even below 1 percent.

The flow cell 3 is suitably made of black glass, and also the tube 7 and the suction nipple 10 consist of glass. It is, however, also possible to make the cell 3, the tube 7, and the suction nipple 10, or also the suction nipple 10 alone, of high-grade steel. In such a construction, the sample vessels 17 to 21 may readily be sealed, for instance, by means of a skin 28 made of a plastic. During the downward movement of the tube 7, this sealing skin is then piereced by the conical lower end of the suction nipple 10 as is shown in FIG. 2.

What We claim is:

1. An arrangement for the successive investigation of several samples by means of light passing through the sample, including a vertically disposed flow cell having a lower suction end, a vertical suction nipple connected with its upper end to said lower suction end, while an upper discharge end of said cell is fixedly connected with the lower end of a vertical tube, a stationary piston surrounded by said vertical tube, a source of light and a photocell, means for moving said tube and cell and nipple thereon upwardly and downwardly relative to said piston in such manner that in the lower end position of the flow cell said source of light causes a transverse passage of a measuring light beam from said light source through said cell, to said photocell sample vessels including said samples and means for moving said sample vessels horizontally relative to said suction nipple in the upper end position of this nipple, said suction nipple being caused to be immersed into one of said vessels at a time during the downward movement of said cell.

2. An arrangement according to claim 1, in which said flow cell, said tube and said suction nipple constitute a structural unit.

3. An arrangement according to claim 1, including an electric motor for effecting the upward and downward movement of said tube, and an abutment on said tube which, after the end positions of the tube are reached, actuates respective limit switches and switches off the motor.

4. An arrangement according to claim 1, including an electric motor for horizontally moving the sample vessels, after the tube and the cell and suction nipple thereon have been moved upwardly and the nipple is moved outwardly of the vessels.

5. An arrangement according to claim 1, in which the lower suction end of the suction nipple is conical and the sample vessels have conical bottoms facing upwardly toward the conical end of said nipple.

6. An arrangement according to claim 1, in which at least the suction nipple is made of a highgrade steel, and the upper ends of the sample vessels are sealed.

* * * * *